United States Patent [19]
Acharya et al.

[11] Patent Number: 5,363,909
[45] Date of Patent: Nov. 15, 1994

[54] COMPACT CONTACTING DEVICE

[75] Inventors: Arun Acharya, East Amherst;
Christian F. Gottzmann, Clarence;
Michael J. Lockett, Grand Island;
James S. Schneider, Akron; Richard
A. Victor, Grand Island; Robert
Zawierucha, East Aurora, all of N.Y.

[73] Assignee: Praxair Technology, Inc., Danbury, Conn.

[21] Appl. No.: 799,279

[22] Filed: Nov. 27, 1991

[51] Int. Cl.$^5$ .................................................. F28C 3/06
[52] U.S. Cl. ..................... 165/111; 261/38; 261/89; 62/42
[58] Field of Search ............ 165/111, 88; 261/88, 261/89; 62/42

[56]  References Cited
U.S. PATENT DOCUMENTS

| | | | |
|---|---|---|---|
| 2,944,801 | 7/1960 | Katy et al. | 261/24 |
| 3,221,985 | 12/1965 | Burdett | 233/15 |
| 3,233,880 | 2/1966 | Podbielniak | 261/83 |
| 3,809,375 | 5/1974 | Bonnet | 261/87 |
| 4,038,353 | 7/1977 | Vladimirovich | 261/89 |
| 4,283,255 | 8/1981 | Ramshaw et al. | 203/49 |
| 4,382,045 | 5/1983 | Wem | 261/89 |
| 4,382,900 | 5/1983 | Wem | 261/89 |
| 4,549,998 | 10/1985 | Porter et al. | 261/88 |
| 4,731,159 | 3/1988 | Porter et al. | 165/88 |

FOREIGN PATENT DOCUMENTS

| | | | |
|---|---|---|---|
| 265120 | 7/1927 | United Kingdom | 261/88 |
| 1366312 | 9/1974 | United Kingdom | 261/89 |

OTHER PUBLICATIONS

Operating Characteristics of Rotating Beds, Majed Keyvani, Ph.D. dissertation, Case Western Reserve University, Oct. 31, 1988.

Primary Examiner—Albert W. Davis, Jr.
Attorney, Agent, or Firm—Clyde V. Erwin, Jr.; Stanley Ktorides

[57] ABSTRACT

An apparatus comprising a rotatable mass of structured packing for mass or heat transfer between two contacting fluids of different densities wherein the packing mass is made up of corrugated sheets of involute shape relative to the axis of the packing mass and form a logarithmic spiral curved counter to the direction of rotation.

6 Claims, 7 Drawing Sheets

COMPACT CONTACTING DEVICE

The government has rights in this invention pursuant to Contract No. NAS3-25560 awarded by the NASA Louis Research Center.

TECHNICAL FIELD

This invention relates to mass and heat transfer systems between two fluids of different densities including the use of such systems for separating air into its components, principally nitrogen, oxygen and argon, employing distillation at very low (cryogenic) temperatures.

BACKGROUND ART

Cryogenic air separation has been the major commercial source of air components for over half a century, and those components have become increasingly important industrial products. For example, steelmaking today is dependent upon pipe-line quantities of oxygen.

Conventionally, cryogenic air separation is carried out in a system of stationary distillation columns which may be a hundred or more feet tall and ten or more feet in diameter. Within the column, liquid flows downwardly be gravity into and out of a series of plate-like structures holding shallow pools of liquid. The bottoms of the plates or trays are perforated so that vapor under sufficient pressure flows upwardly into and through each liquid pool to the next higher pool. The vapor pressure is also sufficient to prevent the liquid pools from "weeping" through the tray perforations. The liquid must go downward by gravity from one pool to the next via drains called downcomers. The result is a stage by stage counter-current contact between the liquid as it moves down the column and the vapor as it moves upwardly. Alternatively, instead of trays, the distillation columns are filled with a mass of material referred to as packing, which can be, for example, glass beads, shaped metal pieces, wire mesh or a honey comb-like structure made of sheet metal. Liquid flows down the labyrinth of passages in the packing and makes continuous counter-current contact with the vapor which rises because a somewhat lower pressure is maintained at the top of the column than at the bottom. With packing, the vapor is not "forced" through successive pools of liquid but passes over the surface of the liquid which is in the form of a downwardly flowing film or streamlet. Consequently, less difference in pressure is required between the bottom and the top of a column in operating a packed column than a trayed column. This can be translated into lower energy costs for a packed column.

In a stationary cryogenic air separation system, the separation process or rectification is basically the same whether the columns are trayed or packed. How the separation takes place is illustrated by separation of nitrogen from oxygen in the largest column of a typical system, called the low pressure column. Liquid nitrogen boils at lower temperature ($-383°$ F.) than liquid oxygen ($-360°$ F.), and therefore liquid nitrogen is said to be more volatile (capable of being changed from a liquid to a gas) than liquid oxygen. The boiling points given for both liquid nitrogen and oxygen are at one atmosphere of pressure which is normal atmospheric pressure at sea level. In a typical low pressure column, the downwardly flowing liquid begins at the top as nitrogen. The rising vapor at the bottom is oxygen from a boiling pool. The oxygen vapor, as it rises, picks up the more volatile nitrogen from the descending liquid and becomes increasingly richer in nitrogen. At the top of column, the vapor becomes nearly 100% nitrogen, one product of the distillation, and it is in equilibrium with the liquid nitrogen which in turn is "stripped" of almost all of its nitrogen as it descends and becomes nearly 100% oxygen, another product of the distillation, at the bottom of the column. Air is fed to the middle of the column.

It is an object of this invention to carry out mass and/or heat transfer between two fluids of different densities, including cryogenic air separation, in a rotating apparatus using an ordered or structured packing mass wherein one fluid is expelled from the center of the mass uniformly through the packing by centrifugal force resulting from the rotation, and the other fluid, less dense than the first fluid, moves from outside of the mass through the packing toward the center.

It is another object of the invention to greatly reduce the size of a cryogenic air separation system from that required when conventional stationary distillation columns are utilized.

SUMMARY OF THE INVENTION

The above and other objects are attained by:

A rotatable cylindrical mass of packing structured to provide substantially uniform distribution of a fluid in at least the direction parallel to the axis of the packing mass when it is rotated, whereby the fluid is outwardly expelled in counter-current contact with a less dense fluid moving inwardly from outside the cylindrical mass.

A method of cryogenic air separation wherein a liquid mixture of air components is in mass transfer contact with a vapor of a different mixture of air components, the liquid mixture being expelled outwardly by centrifugal force from the center of a rotating cylindrical mass of structured packing distributing the liquid mixture substantially uniformly in a direction parallel to the axis of the cylindrical mass, and the vapor mixture being moved inwardly from the outside of the cylindrical mass in mass transfer contact with the liquid mixture.

As used herein, the term a "different mixture of air components" includes a mixture having the same two or more components but in different concentrations than those in another "mixture of air components."

DETAILED DESCRIPTION

The process and apparatus of this invention will be described in detail with reference to FIGS. 1 through 9

Figure 1:
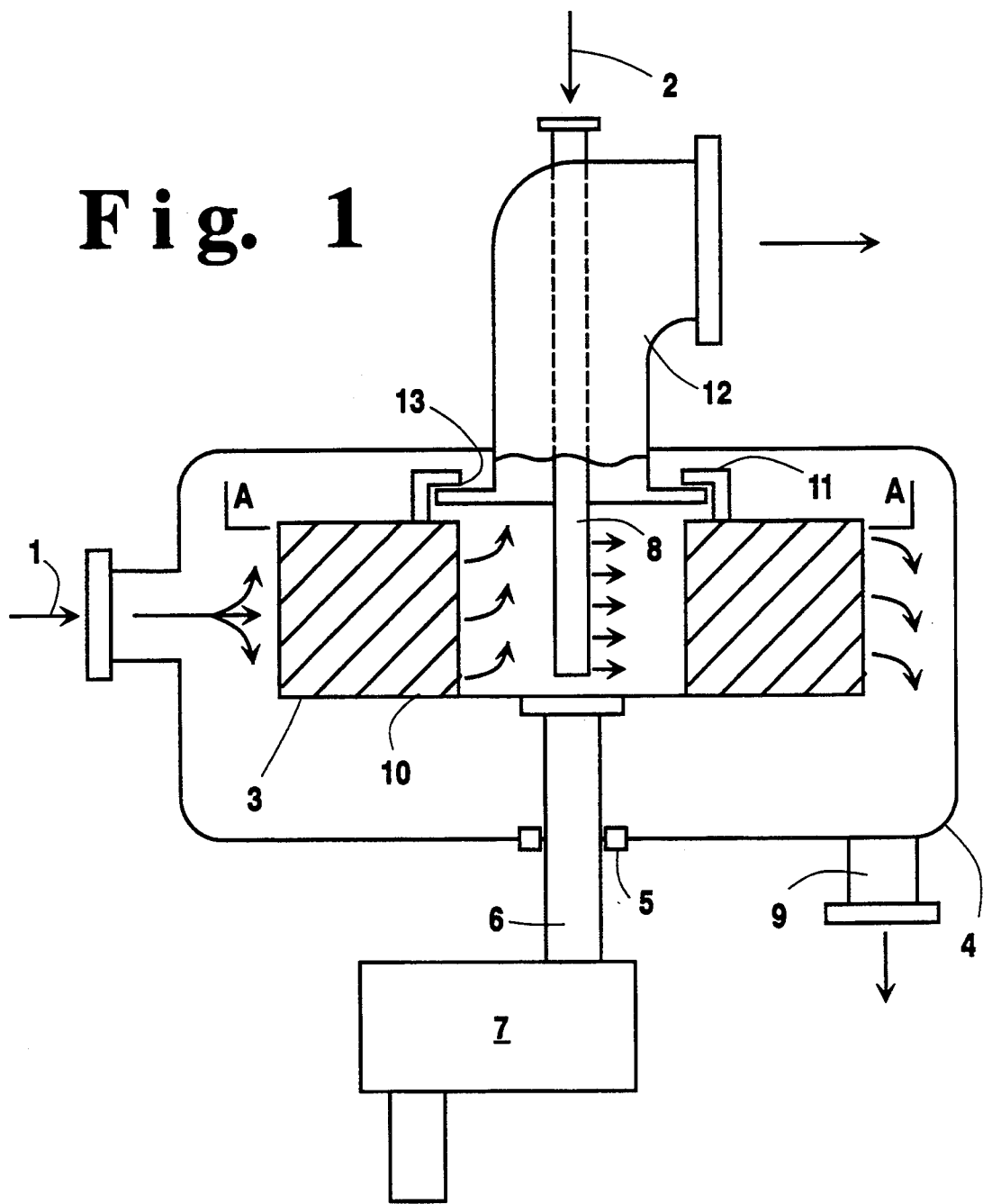
FIG. 1 is a cross-section of a separation column employing a rotating mass of structured packing in accordance with the invention.

In FIG. 1, a feed vapor 1 and a feed liquid 2 having different compositions or concentrations of air components are introduced into the system containing a rotatable cylindrical mass of packing 3 within a container 4 which is sealed by seal 5 where rotatable shaft 6 passes through container 4 to rotate cylindrical mass 3, shaft 6 being driven by gearmotor drive 7. Conveniently, the liquid is sprayed from conduit 8 uniformly from top to bottom onto the inner surface of cylindrical mass 3 as shown by the arrows extending from conduit 8. The liquid is expelled outwardly by centrifugal force through the packing mass 3 as a result of rotating the mass. Rotational speeds of up to about 2000 rpm are suitable depending upon the radius of the packing mass, since as a result of its rotation we achieve effective "g" loads in the packing, and thus on the liquid being expelled, in the range of 50 to 1000, i.e. multiples in that range of the natural gravitational force. The liquid, therefore, passes through the packing mass at much higher velocities than when liquid passes downwardly through packing in a stationary column under the influence of only natural gravity. The higher "g" loads due to the centrifugal force employed in our invention greatly increases the fluid handling capacity of the packing and hence reduces the amount of packing required for a given amount of throughput. The efficiency of the packing used in our invention can also be enhanced in terms of the volume of packing required to achieve a given degree of separation of the components of the counter-contacting fluid feeds. This is accomplished by using higher density packing in terms of increased fluid contact surface per unit of volume. While higher packing density typically results in reduced capacity, this effect is minimized or counteracted by the higher fluid velocities which increase capacity per unit volume of any density of packing. The overall result can be a highly efficient, compact system of either mass transfer or heat transfer between two fluids of different densities (e.g., liquid and gas).

Figure 2:
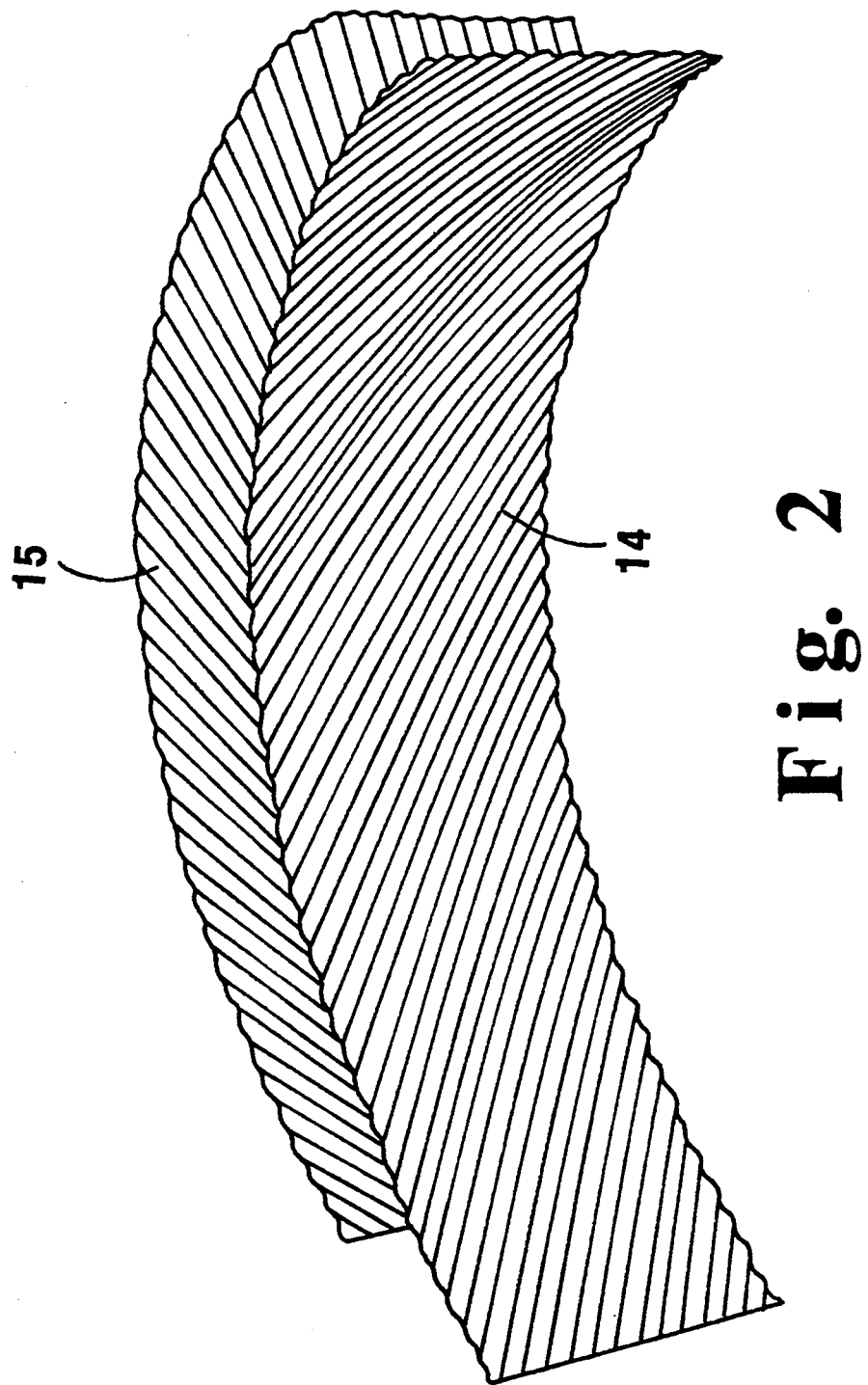
FIG. 2 is a drawing from a photograph of an adjoining pair of packing elements which are a preferred embodiment of the invention.
Figure 3:
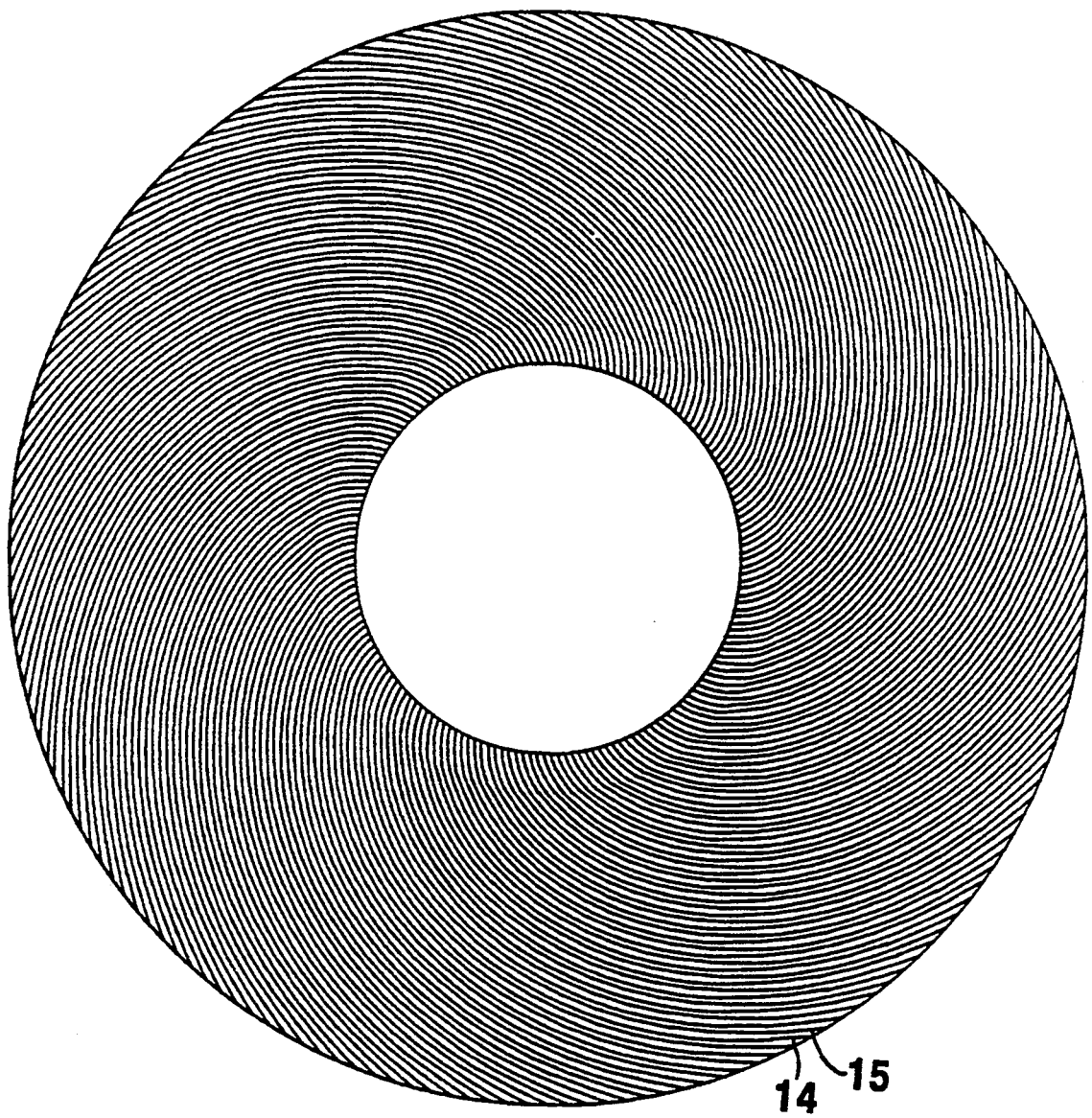
FIG. 3 is a cross-section along plane A—A in FIG. 1 of a preferred arrangement of elements, such as those shown in FIG. 2.
Figure 4:
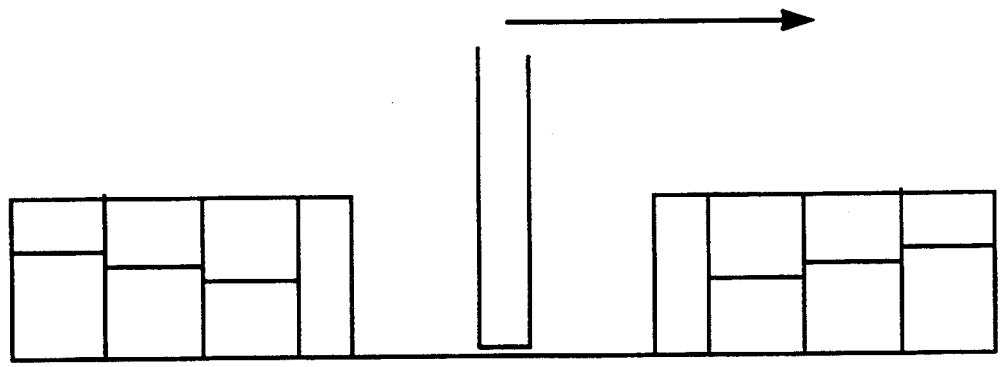
FIG. 4 is a cross-section as in FIG. 1 of an alternative configuration of the rotating mass having concentric sections of different densities.
Figure 5:
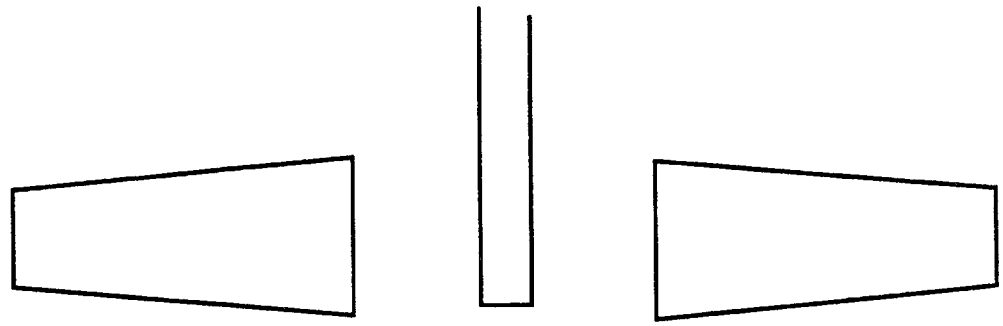
FIG. 5 is a cross-section as in FIG. 1 of another alternative configuration of the rotating mass which is tapered toward its outside boundary.
Figure 7:
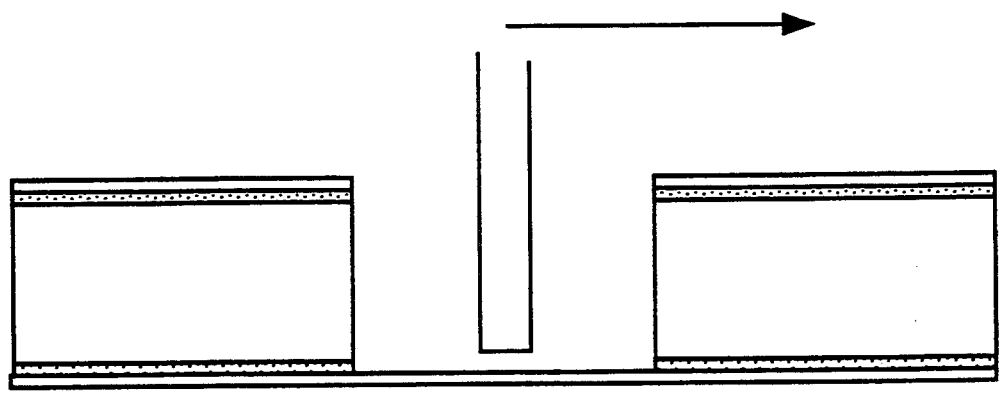
FIG. 7 is a cross-section as in FIG. 1 of the cylindrical rotating mass being sealed at both ends thereof.
Figure 6:
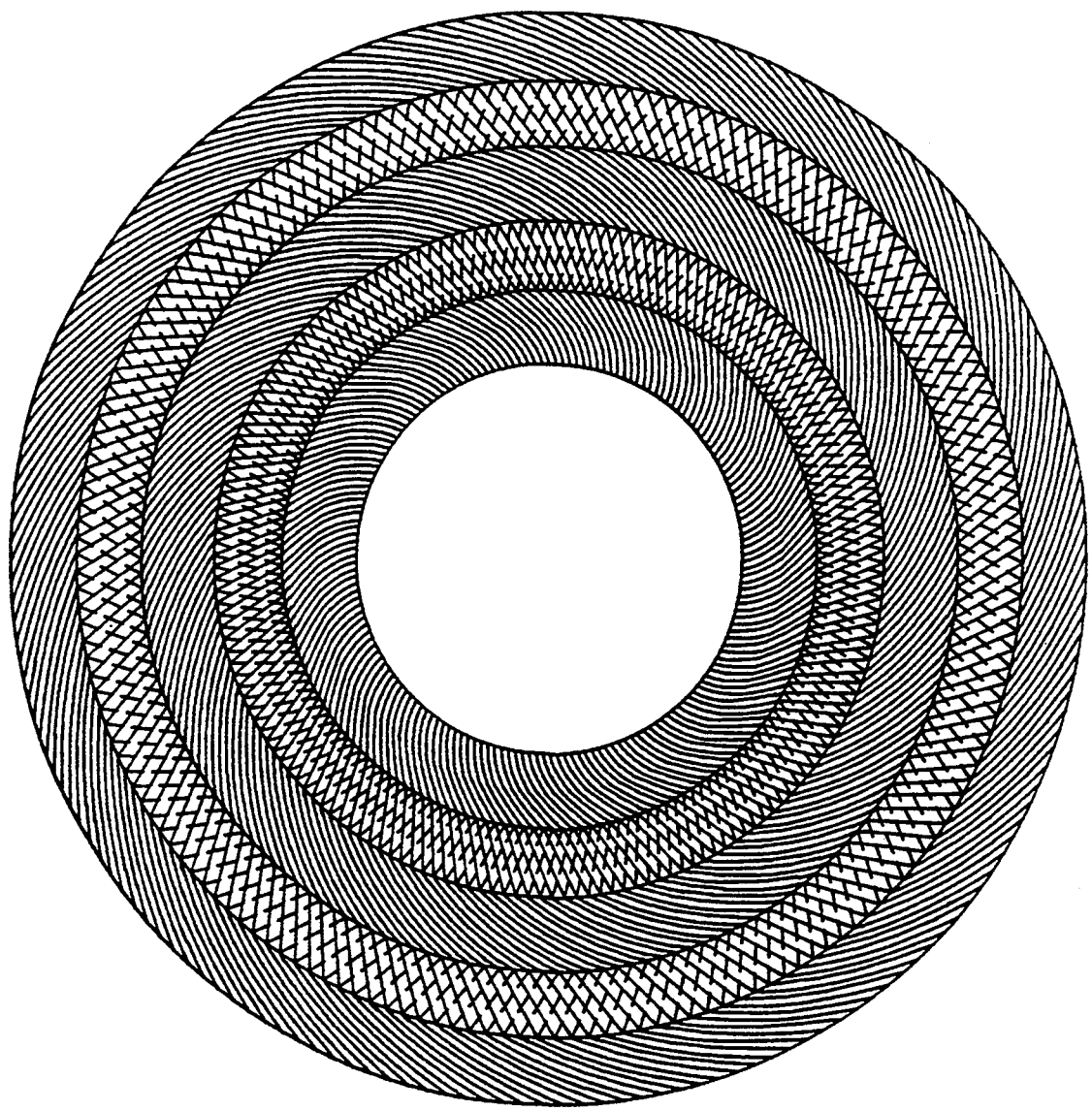
FIG. 6 is a cross-section as in FIG. 3 of yet another alternative configuration of the rotating mass having concentric sections to provide fluid distribution both parallel and tangential to the axis of rotation.

The highest "g" loads achieved in cylindrical packing mass 3 is, of course, at its outer periphery. The "g" load may be calculated for any given point in the packing mass in a conventional way by multiplying shortest distance from the point to the axis of rotation, i.e. the radius, times the square of the velocity in radians per second, and dividing the product of that multiplication by the standard acceleration of gravity of about 32 ft/sec/sec. The packing mass 3 is so structured, as illustrated in FIGS. 2 and 3, as to maintain a substantially uniform distribution of the liquid from top to bottom of packing mass 3, i.e. in the direction parallel to the axis of its rotation. Continuing with FIG. 1, the liquid expelled through packing mass 3 is conveniently collected through drain 9. The feed vapor 1 passes through the packing mass 3 from the outside to the center of the mass because a lower pressure is created in the center than that of the feed vapor 1 as it enters container 4. This pressure difference is maintained by enclosing or sealing off the entire bottom of the packing mass, including the open center, by bottom plate 10, and by top cap 11 fitting as shown to vapor exhaust structure 12. A seal 13 between top cap 11 and exhaust structure 12 is provided since cap 11 rotates with respect to structure 12. Within the packing mass, the vapor feed 1 is in mass transfer, counter-current, contact with feed liquid 2 which is distributed as a thin film over the surfaces of packing mass 3. This means that the more volatile (readily evaporable) component of liquid feed 2 tends to become a part of the vapor, or is stripped from the liquid, as the liquid feed moves outwardly. The vapor feed, on the other hand, thus becomes richer and richer in the most volatile component of the liquid feed. Illustratively, as described in the "Background Art" section above, the system of FIG. 1 can be operated as a low pressure air separation column, i.e. when the feed vapor 1 is oxygen and the feed liquid 2 is nitrogen. By mass-transfer in packing mass 3, feed vapor 1 is transformed into nearly all nitrogen gas and feed liquid 2 becomes nearly all oxygen liquid. Air may be fed into the middle of the mass. Surprisingly, such a mass transfer process is very efficiently performed in our system in that the volumetric size of the system per unit of capacity is of the order of more than ten times less than for a conventional stationary packed column where the liquid feed passes through the packing by gravity, and, operational costs are substantially the same.

In FIG. 2, metal sheet 14 is corrugated to form a series of alternating peaks and valleys oriented at about 45° to a plane perpendicular to the rotational axis of the packing mass 3 shown in FIG. 1. Adjacent sheet 15 also has a series of alternating peaks and valleys oriented at about 45° to the same plane as sheet 14. However, as shown, the peaks and valleys of sheet 15 are approximately perpendicular to those of sheet 14. In FIG. 2, sheets 14 and 15 are spaced apart to show their respective configurations. In cylindrical mass 3 a sufficient number of alternating sheet 14s and 15s are packed together adjacent to each other to form mass 3 without voids other than as created by the corrugations. It is preferred that metal sheets 14 and 15 be formed or bent into an involute shape shown in FIG. 2 before being assembled into packing mass 3. Typical aluminum sheeting used for structured packing is difficult to bend and will "spring back" when an attempt is made to do so. We have found that it is preferable to heat treat such corrugated sheets of type 3003 aluminum before bending or forming. Suitable treatment times are from about ½ to 2 hours at temperatures of from 400° F. to 600° F. A treatment of one hour at a temperature of about 530° F. is most preferred. The metal sheets become pliable and thus can be contoured into the desired configuration such as shown in FIG. 2 (and FIG. 3) using suitably designed forming tools.

One alternative configuration of the structured packing in cylindrical mass 3 in that the mass is made up of more than one concentric section each of which has a different density. For instance, only one-third of sheets 14 and 15 would be used for an inside concentric section of mass 3. A second middle concentric section would be more dense being made up of packing sheets of same form as sheets 14 and 15 except having corrugations smaller in amplitude. An outer concentric section would be more dense than the middle section being made up of sheets of the same involute form as the outer third (on the left side) of sheets 14 and 15. See FIG. 4. A reason for such concentric sections of increasing density from the inside to the outside of cylindrical packaging mass 3 is that the centrifugal force on the feed liquid 2 increases the greater the distance is from the axis of rotation of mass 3, and with such variable density in the packing in conjunction with a uniform flow of the liquid from inside to outside, the overall efficiency of the system is enhanced with the use of increased packing surface for mass or heat transfer purposes. Also, mass 3 can be made more compact than with uniform density. The density of the structured packing useful in this invention can vary from about 100 to about 1000 ft.$^2$/ft.$^3$.

Packing compaction can also be effected by tapering the cylindrical mass 3 to a smaller height at its outside boundary. Sheets 14 and 15 could be employed as configured in FIG. 3, but would be tapered in height. The amplitude of the corrugations of sheets 14 and 15 would not have to be changed from the inside to the outside of mass 3. The amount of packing being less in a tapered mass, the cost of the system would be appreciably reduced. See FIG. 5.

Another alternative to the configuration of the structured packing in cylindrical mass 3 is to have concentric sections of packing elements such as sheets 14 and 15 in FIG. 2, but sheets in alternate sections would be oriented to provide distribution of the feed liquid (a) in a plane perpendicular to the rotational axis of mass 3 and then again (b) parallel to that axis. By way of illustration, the inside and outside one third of sheets 14 and 15 (right and left as depicted in FIG. 2), would form inside and outside concentric sections of mass 3. A middle concentric section would be a stack of flat, washer-shaped sheets corrugated the same as sheets 14 and 15 but not formed into a involute shape. The reason for this alternative configuration is so that cylindrical mass 3 can be rotated at lower rpm when there is not sufficiently uniform distribution of liquid feed 2 in a direction tangential or circumferential to the axis of rotation of cylindrical mass 3. See FIG. 6. In place of packing sections with packing sheets in a plane perpendicular to the axis of mass 3 as in FIG. 6, a fluids distributor could be used as in a conventional stationary packed column.

FIG. 3 is a cross-section of the cylindrical packing mass 3 along plain A—A in FIG. 1. A number of pairs of involute-formed corrugated metal sheets 14 and 15 are assembled into mass 3. The sheets are spaced apart only by the corrugations which are in point to point contact with the corrugations on adjoining sheets. The involute form of the metal packing sheets provides a predictable and efficient flow of liquid 2 through mass 3 so that there is substantially uniform counter current, mass transfer contact between vapor feed 1 and liquid feed 2. Our preferred configuration of packing sheets 14 and 15 in mass 3 is a logarithmic spiral curved counter to the direction of rotation shown in FIG. 3. Conveniently, the corrugated metal sheets are banded together around the outside and inside to form cylindrical mass 3. The band (not shown) is suitably a strip of perforated sheet metal or wire mesh so that both the feed vapor and feed liquid 2 can readily pass through the band. Preferably, both ends (top and bottom in FIG. 1) of the cylindrical mass 3 are sealed with a fitted sheet of flexible metallic or polymeric material in order to confine vapor 1 and liquid 2 within mass 3. Otherwise channeling of the liquid (or vapor) could occur at either end (top or bottom) of mass 3. See FIG. 7.

Figure 8:
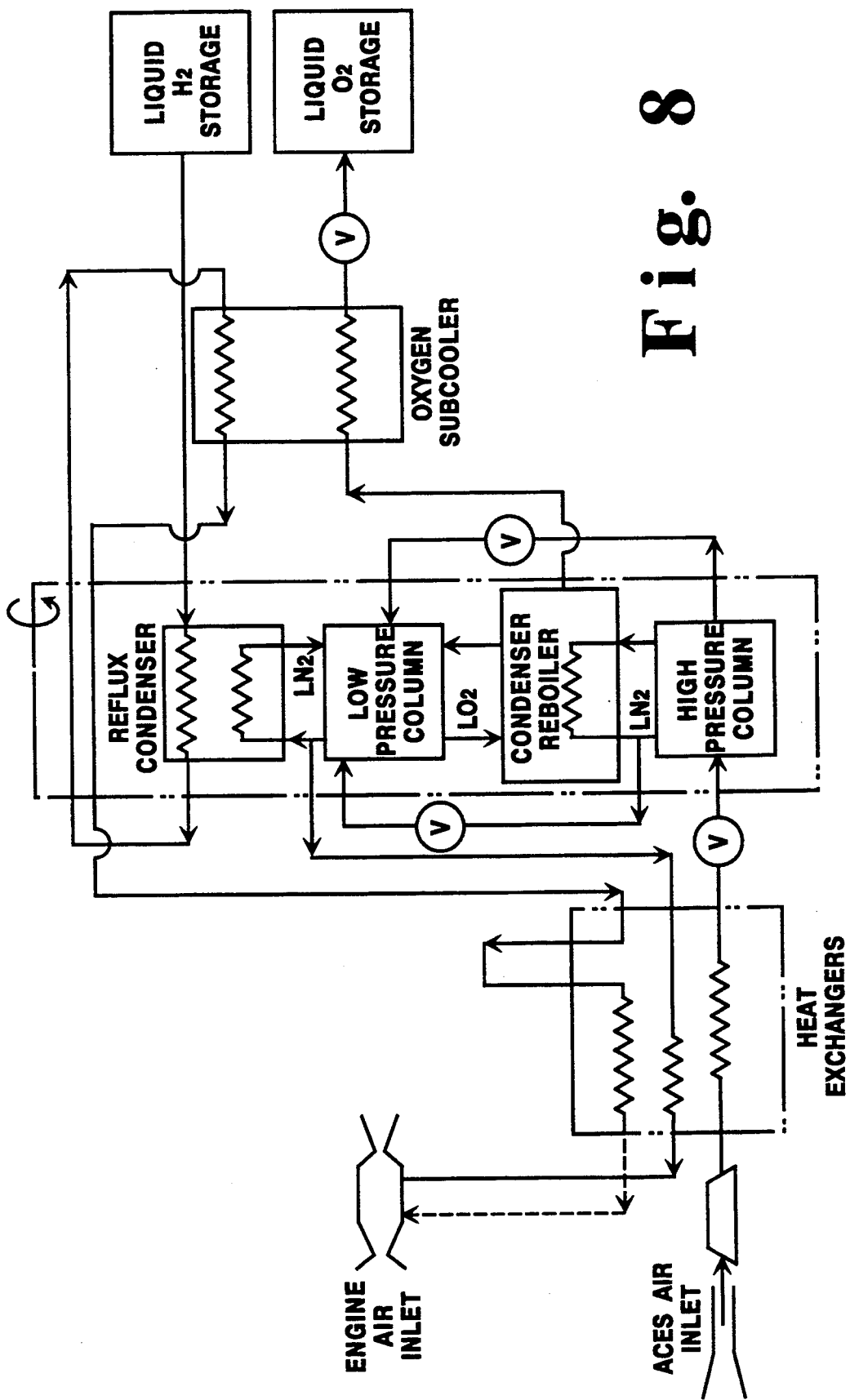
FIG. 8 is a simplified flow diagram of an air collection and enrichment system (ACES), the air separation columns of which is one application of the invention. An ACES may be used to supply oxygen to a rocket engine.

The low and high pressure columns in air collection and enrichment system (ACES) diagrammed in FIG. 8 are a particularly practical application of this invention for cryogenic air separation. A rocket propulsion system is made smaller and lighter if relatively pure oxygen can be extracted from surrounding air which is within the limits of the earth's atmosphere however thin.

Figure 9:
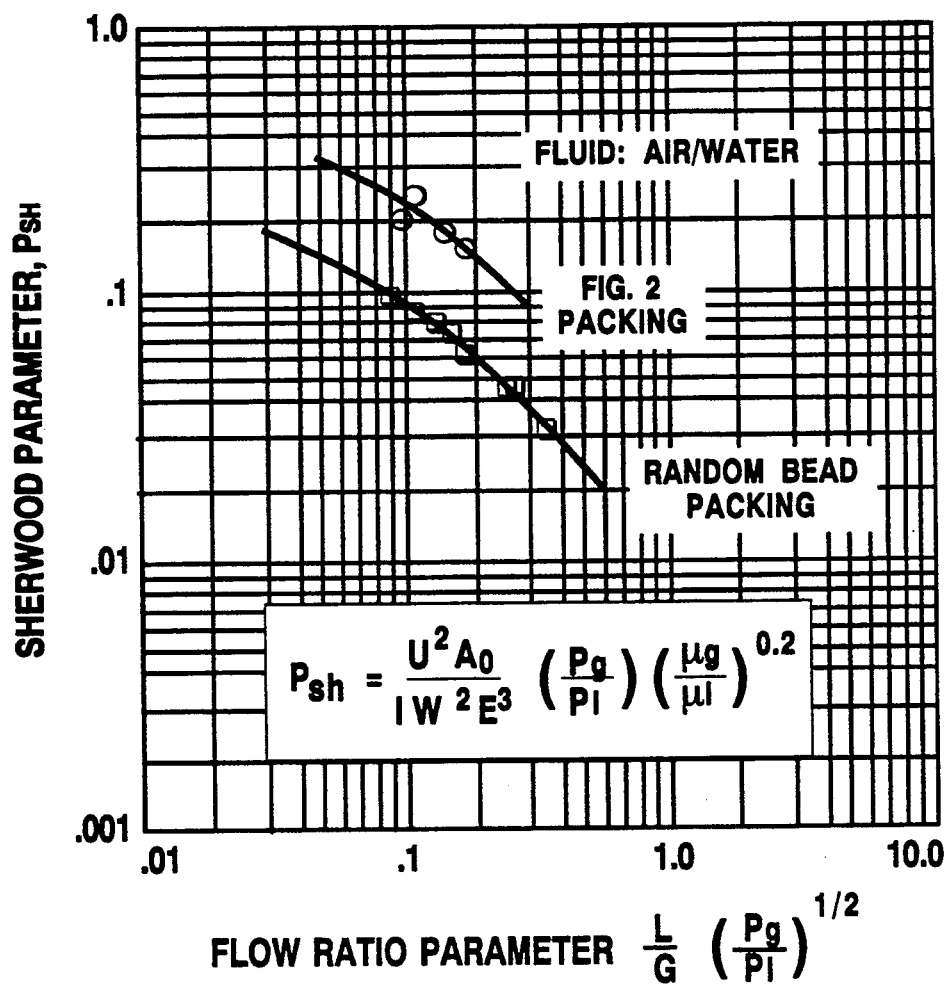
FIG. 9 is a graph of experimental data showing an advantage of the structured packing mass as shown in FIG. 1, 2 and 3 over a packing of glass beads randomly arranged.

FIG. 9 is based upon experiments carried out comparing the flow capacity of the structured packing of this invention with a random packing of glass beads in terms of the well-accepted Sherwood Parameter in a rotating distillation column, the feed vapor being air and the liquid feed being water. See (a) "VOC Removal With a Rotary Air Stripper", R. Fowler and A. S. Khan, Glitsch, Inc., AICHE Annual Meeting, New York, Nov. 15–17, 1987, (b) "Hydraulic Performance and Efficiency of KOCH FLEXIPAC Structured Packings", K. J. McNulty and Chang-Li Hsieh, Abcor, Inc., AICHE Annual Meeting, Los Angeles, Nov. 14–19, 1982, and (c) "Fluid Flow and Mass Transfer in Rotating Packed Beds with Countercurrent Gas-Liquid Flow", S. Munjal, A dissertation presented to the Sever Institute of Washington University in partial fulfillment of the requirements for the degree of Doctor of Science, St. Louis, Mo., December 1986). While these experiments were carried out at room temperature, Sherwood Parameter results are known to be correlatable to temperatures. The Flow Parameter variations along the horizontal axis of FIG. 9 are also recognized as correlatable to typical variations in cryogenic air separation. Thus, as conditions were varied in flow from left to right on FIG. 9, the Sherwood Parameter was always higher for the packing of this invention than for glass beads suggested in the prior art (See reference (c) above in this paragraph) for rotating distillation columns.

Finally, we have discovered that the feed liquid 2 may be sprayed at varying angles to inside of cylindrical packing mass 3 and results are improved if the spray angle relative to a plane perpendicular to the rotational axis is varied as the rpm of the mass is varied so that liquid goes directly into the channels formed by the corrugated metal sheets 14 and 15, i.e., a "splash back" effect is avoided. We envision an automatic control system for varying the designated angle of the liquid spray as rpm of the packing mass is varied.

It will be understood by those skilled in the art to which this invention pertains that there are many other embodiments of the invention not described above that are within the spirit and scope of the claims.

We claim:

1. An apparatus for mass or heat transfer between two contacting fluids of different densities comprising a rotatable mass of structured packing which provides distribution of one fluid in at least the direction parallel to the axis upon rotation as said one fluid is directed outwardly by means from the center of said mass of structured packing and is expelled by rotation of said mass outwardly through said mass in counter-current contact with a fluid of lesser density moving inwardly through said mass from means on the outside of said mass wherein the packing mass is made up of corrugated sheets of involute shape relative to the axis of the packing mass and form a logarithmic spiral curved counter to the direction of rotation of the mass of structured packing, said corrugated sheets having corrugations in crossing relationship to each adjacent corrugated sheet.

2. The apparatus of claim 1 wherein the corrugated sheets are formed from aluminum heat treated at a temperature above about 400° F.

3. The apparatus of claim 1 the density of the packing mass is greater on the outside than on the inside.

4. The apparatus of claim 1 wherein the packing mass is cylindrical in shape and rotatable around the axis of the cylinder, the cylindrical mass being tapered from inside to outside.

5. The apparatus of claim 1 wherein the rotatable mass of packing is also structured to provide distribution of the one fluid in the direction tangential to the axis of the packing mass.

6. The apparatus of claim 1 wherein the mass of packing is cylindrical in shape and is sealed at both ends.

* * * * *